(12) United States Patent
Hudson

(10) Patent No.: US 6,462,776 B2
(45) Date of Patent: *Oct. 8, 2002

(54) SECURITY CONTROL SYSTEM

(75) Inventor: John Hudson, Cove (GB)

(73) Assignee: Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,469

(22) Filed: Sep. 15, 1998

(65) Prior Publication Data

US 2002/0005900 A1 Jan. 17, 2002

(30) Foreign Application Priority Data

Sep. 17, 1997 (GB) ............................. 9719798

(51) Int. Cl.⁷ ................................. H04N 7/18
(52) U.S. Cl. ...................... 348/159; 382/298
(58) Field of Search ................ 348/169, 180, 348/174, 137, 143, 144, 149, 152, 159, 153, 441, 445, 564, 565, 588, 585, 154, 150; 382/298

(56) References Cited

U.S. PATENT DOCUMENTS

| | | | |
|---|---|---|---|
| 4,931,872 A | 6/1990 | Stoddard et al. ............ 358/183 |
| 5,164,827 A | * 11/1992 | Paff ............................ 348/143 |
| 5,216,502 A | * 6/1993 | Katz ........................... 348/150 |
| 5,237,408 A | * 8/1993 | Blum et al. ................ 348/154 |
| 5,909,548 A | * 6/1999 | Klein et al. ................ 348/137 |
| 6,031,573 A | * 2/2000 | MacCormack et al. ..... 348/154 |

FOREIGN PATENT DOCUMENTS

| | | |
|---|---|---|
| EP | 0 690 628 A1 | 1/1996 |
| WO | WO 96/31984 | 10/1996 |

* cited by examiner

*Primary Examiner*—Chris Kelley
*Assistant Examiner*—Gims Philippe
(74) *Attorney, Agent, or Firm*—Frommer Lawrence & Haug LLP; William S. Frommer; Darren M. Simon

(57) ABSTRACT

A security control system comprises n inputs (C1-C128) for receiving video signals from n cameras. A video switcher (2) including a programmable controller (4) is programmable to connect any one of the n inputs (C1-C128) to any one of m outputs (R1-R28) where m is less than n, in any selectable time sequence. A display control means (6, 8) connects the m outputs (R1-R28) of the switcher (2) to p displays (M11-M22) via p channels each associated with m/p of the outputs of the switcher. The display control means (6, 8) has a programmable controller (10, 12) linked to the controller (4) of the switcher to selectively scale and position the images represented by the video signals on the displays in desired display formats and to define sequences of displays.

8 Claims, 4 Drawing Sheets

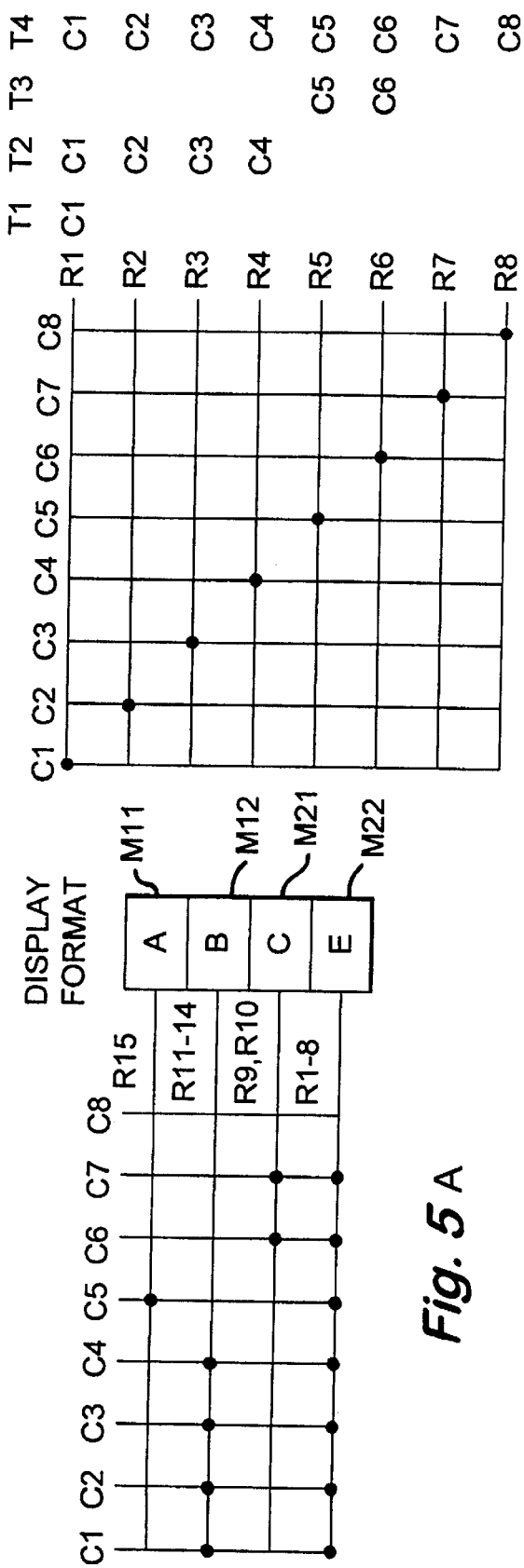
Fig. 5 A
Fig. 5 B
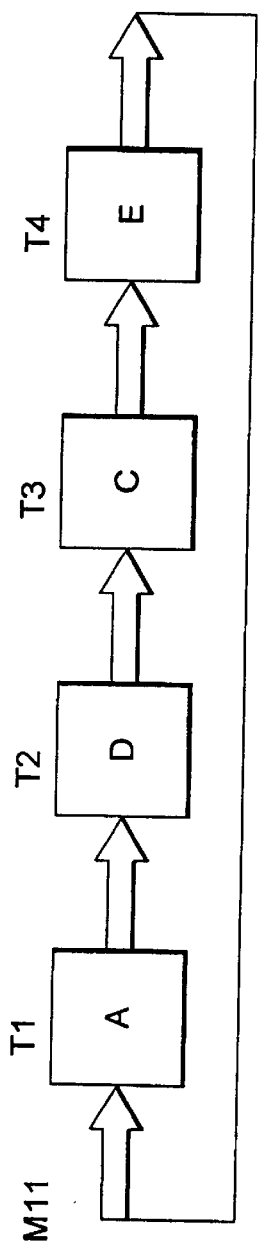
Fig. 6

SECURITY CONTROL SYSTEM

BACKGROUND OF THE INVENTION

1. Field of the Invention

The present invention relates to a security control system. Illustrative embodiments of the invention relate to a security system comprising video cameras, the control system, and monitors for displaying images received by the cameras.

2. Description of the Prior Art

Security CCTV systems are now finding widespread use in monitoring shopping centres, town centres, and commercial and industrial buildings.

The size of these systems may vary from one or two video sources for small retail outlets, petrol stations etc., to large town centre installations which may have greater than a hundred video sources with hundreds of alarm input signals.

In large installations, a great deal of security information is provided to the operators for evaluation. Such large security systems are typically managed by a system controller which can: provide access to a large number of video sources (for example, a hundred video sources) and many hundreds of alarm signals; allow control of pan and tilt heads for each camera; provide some control panels (e.g. ten or fewer control panels) for enabling an operator to interact with the system and present video information on some (e.g. thirty or more) video monitors.

Managing this information to ensure that any incident may be efficiently and effectively identified, dealt with and recorded for evidential purposes can be very operator intensive.

To improve the efficiency of the monitoring process, large security sites are often partitioned or broken down into areas, with one operator assigned responsibility for monitoring each area.

System controllers may provide the facilities to effectively partition an installation into a number, for example eight, fully functioning sub-systems. Each sub-system has a control interface, a number of video monitors, and access to a sub-set of the video sources and alarm information from the complete installation.

The monitors are watched by operators who use the control panels, e.g. in response to alarms, to control the views presented by the cameras in order to determine the cause of an alarm. Even by assigning one operator to each partition of an installation, an event may trigger many alarms and present the operator with an overwhelming amount of alarm and video information.

Consider by way of example a CCTV security system having 128 camera and 32 video display monitors.

The problem with such a large number of cameras and video display monitors is that it becomes very difficult for security operators to effectively monitor all of the video information provided.

It is possible to reduce the number of monitors. For example 16 monitors could each show a fixed sequence of eight cameras giving full coverage of all video information in the system. A fine balance must however be reached between the number of video monitors and the number of steps in the camera sequence. For example, if each camera in a sequence of eight cameras is displayed for three seconds, then there will be a 24-second (eight source multiplied by three seconds) delay until the sequence is complete. This delay may be unacceptable for effective monitoring and important information could be missed.

It is possible to use 32 monitors each displaying four one-quarter size images to ensure that all 128 video signals are displayed. In this installation there is no time delay as four images are displayed on each video monitor simultaneously. Again however the number of video displays can be a problem for effective monitoring purposes, and the system installation becomes expensive to purchase, manage and maintain due to the large amounts of equipment required.

The number of monitors required could be reduced if multi-picture display devices capable of producing nine or 16 images were used. The problem with this approach is that the individual images become very small and it can be difficult to derive sufficient detail from the images for effective monitoring. The installation of these devices is also inflexible in that the order or combination of images displayed on each monitor cannot be easily changed. Although all 128 camera images are displayed, the number and combination of images on each display device may be non-optimum for effective monitor purposes.

SUMMARY OF THE INVENTION

Embodiments of the present invention seek to provide a security system in which a reduced number of monitors allow effective surveillance of images from a large number of cameras.

According to one aspect of the present invention there is provided a control system for use with a surveillance system having n cameras for producing video signals representing images viewed by the cameras and p display devices for displaying the said images where n is greater than p, the control system comprising video switching means having n inputs for receiving respective video signals from the cameras, and p outputs, the switching means being able to selectively connect any one of the n inputs to any one of the p outputs, p display control means able to apply selectable scaling and positioning to video signals received from the outputs to display, simultaneously on a display, one or more selectively scaled and positioned images, and control means for controlling the video switching means and the display control means to select the video signals applied to each display control means, the sequence in time in which the selected video signals are applied, and to select the scaling and positioning of the selected video signals for display.

According to another aspect of the present invention there is provided a control system comprising first video switching means having n inputs for receiving respective video signals and m outputs any one or more of the n inputs being connectable to any one or more of m outputs where m is less than n display control means for selectively coupling the m outputs to p display devices where p is less than m, the display control means being operable to selectively scale the images represented by the video and to selectively position the scaled images on the p display devices, and programmable control means for selecting and varying the selection of the connections of the said inputs of the switching means to the said outputs of the switching means and for selecting and varying the sequence in time in which the said connections are established, and for selecting and varying the scaling and positioning of the images by the display control means.

Thus the present invention avoids the difficult discussed above by combining the ability to display sets of one or more pictures on a display device with the ability to vary the sequences of pictures displayed.

A preferred embodiment of the invention combines multi-picture displays with a sequence program function.

In an embodiment of the invention, the display control means comprises p channels, each channel being connected to m/p outputs of the switching means, and being operable to scale and position any one or more of m/p images on one display device. An example of a channel comprises image scaling means, a multiplexer controlled by the programmable control means for selectively connecting any one of the m/p outputs to the image scaling means, and means for forming a video signal representing one or more scaled images in selected display positions, the scaling means and forming means being controlled by the programmable control means.

This allows a display device connected to one channel to display images in various sizes e.g. full size, ¼ size, ⅛ size and in different positions e.g. picture-in-picture, or an array of four or eight pictures. Furthermore because the switching means is able to connect any input to any output and in any sequence (under the control of the programmable control means) and the multiplexer is also able to connect any one of its inputs to the imaging scaling means in any sequence any combination of one to m/p cameras can be assigned to any one of the display devices for display in any one of many different display formats, and in any one of many different sequences The programmable control means may store a plurality of different display formats, e.g. combinations of one or more images as picture in picture displays or arrays with predetermined scaling and positioning of the images, for retrieval and use. Preferably, in addition, predetermined sequences of formats are stored for retrieval and use.

In a preferred embodiment of the invention the programmable control mans comprises a first programmable controller associated with the video switching means and operable to control the selection of the connections of the said inputs of the switching means to the said outputs thereof and/or the said sequence in time; and a second programmable controller which cooperates with the first programmable controller and associated with the display control means for controlling at least the scaling and positioning of the said images on the p display devices. Thus control of the connections and sequences in the switching means is conveniently separated from control of scaling and display formats in the display control means. The second programmable controller preferably controls the multiplexer of the channel to control the selection of the m/p outputs of the switching means which are coupled to the scaling means. Thus further control of the selection and sequencing of images is provided in the display control means.

Preferably, the second programmable controller includes program storage means for storing a plurality of different display formats, each display format comprising a combination of image display sizes, image display positions for the images represented by video signals received from the m/p outputs of the switching means and/or image sequences. The stored image scales may include full size, and a plurality of different fractional sizes. The fractional sizes may include quarter size and one ninth size. The stored display formats may include picture-in-picture displays and different arrays of separate images simultaneously displayed. The arrays may include an array of four images and an array of eight images.

Thus many different single and multi-picture screen formats and sequences may be stored in the controller of the display control means and recalled for use as necessary.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 illustrate various display configurations on respective monitors; and FIG. 6 illustrates one of many possible display sequences on a single monitor.

DESCRIPTION OF THE PREFERRED EMBODIMENTS

Figure 1:
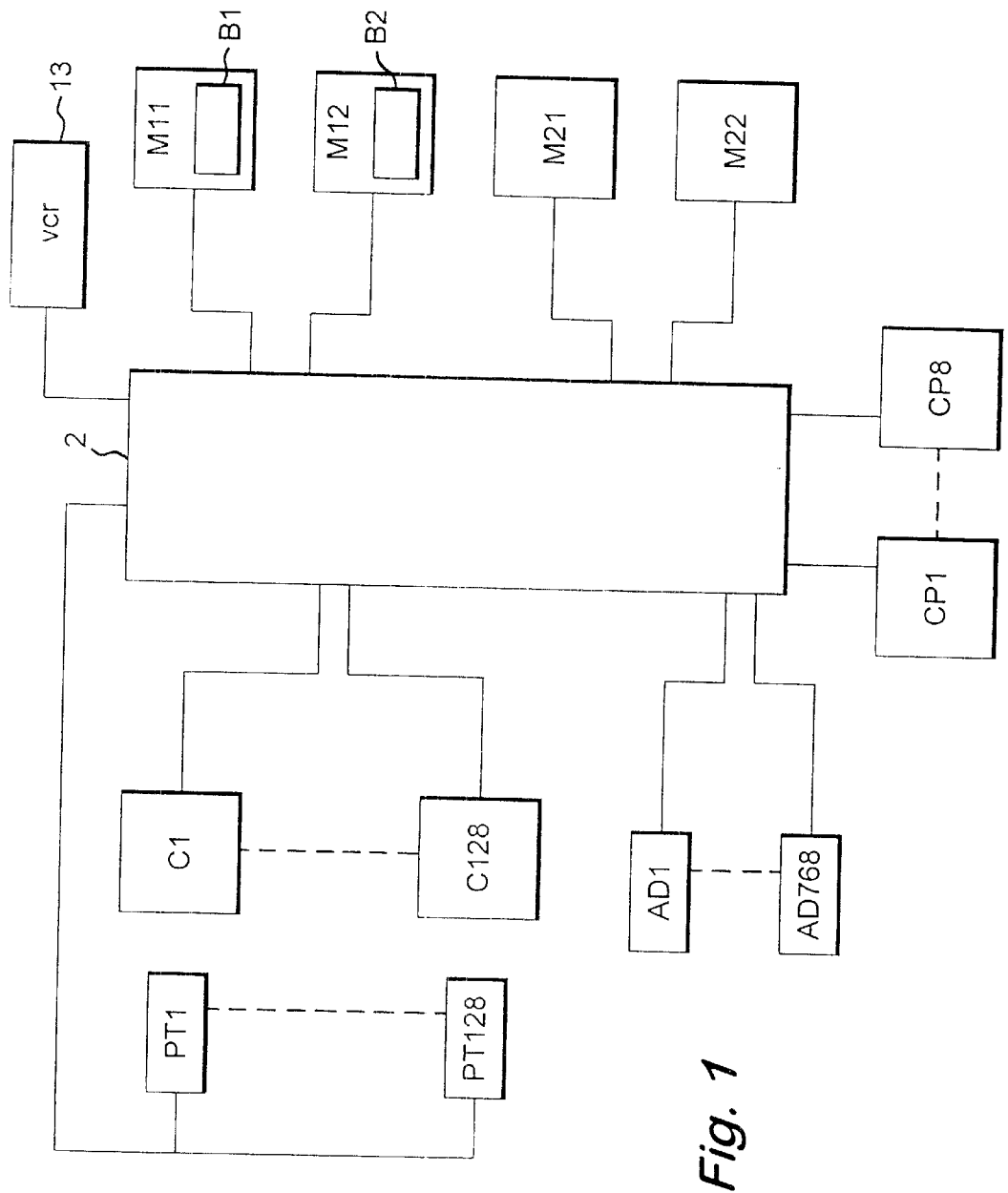
FIG. 1 is a schematic block diagram of an illustrative security system in which aspects of the present invention are implemented.

Referring to FIG. 1 an illustrative security system in accordance with the present invention comprises 128 cameras C1–C128. At least some, and in this example all, of the cameras have pan and tilt heads PT1-PT128. The system also comprises 768 alarm detectors AD1–AD768. One or more video cassette records (VCR) 13 may be provided for recording the video signals produced by the cameras.

A system controller 2 receives analogue video from the cameras C1-C128, and alarm signals from the alarm detectors AD1-AD768. The controller 2 provides control signals to the pan and tilt heads.

Up to eight control panels CP1 to CP8 are provided. There may be more than eight panels. The control panels CP1–CP8 are used to program the system controller 2 and also are used by operators to control the system in use. For example, the operators use the panels to respond to alarms, control the pan-and-tilt heads, and actuate the VCR 13.

The controller 2 controls in accordance with its programming the display of video from the cameras, and the display of alarms, on four monitors M11, M12, M21, M22.

Figure 2:
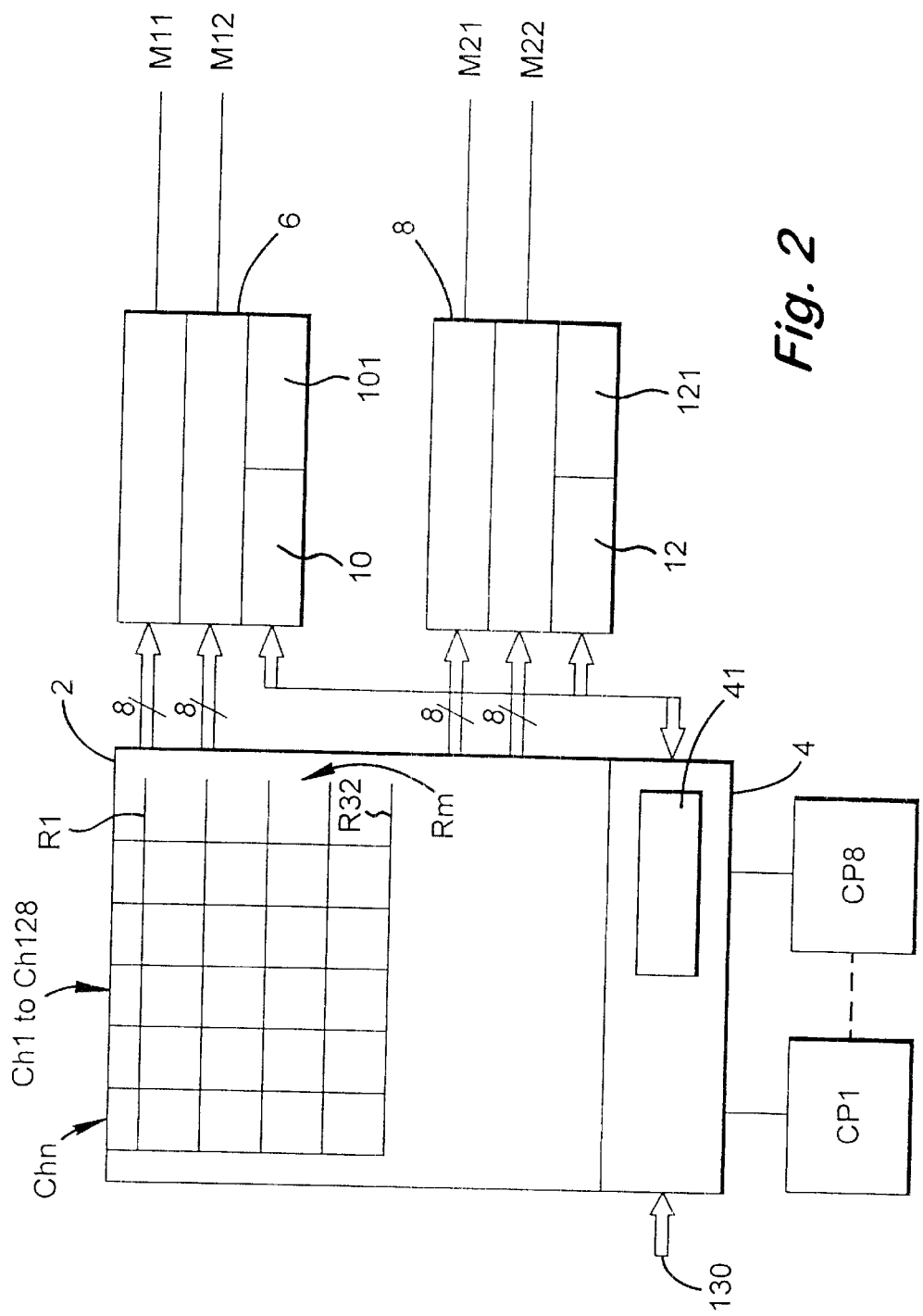
FIG. 2 is a more detailed block diagram of the system controller of the system of FIG. 1.

Referring to FIG. 2, the system controller 2 comprises a video switcher having 128 analogue video inputs and 32 analogue video outputs. The inputs are shown as (vertical) columns Chn, Ch1–Ch128 in FIG. 2, and the outputs as horizontal rows Rm, R1–R32. Video switches are controlled by a programmable controller 4, e.g a special purpose data processor or computer including program storage means 41 to connect the columns Chn to the rows Rm in any desired configuration. In addition, the connections are variable in time, as will be explained below.

The 32 outputs R1 to R32 are organised into four groups of eight outputs. One pair of groups or 16 outputs feed analogue video to a first multi-picture processor 6 and the other pair of groups or 16 outputs feed analogue video to a second multi-picture processor 8.

Each multi-picture processor 6, 8, comprises two identical channels both controlled by a common control processor 10, 12 having a program storage means 101, 121. Each channel processes one group of eight analogue video outputs Ri to Ri+7 e.g. R1–R8.

The monitors M11 M12 are controlled by the two channels respectively of processor 6 and the monitors M21 and M22 are controlled by the two channels of processor 8.

The control processors 10, 12 are linked to the programmable controller 4 to control the display of information on the monitors in accordance with the programming of the controller 4. Programming of the controller 4 correspondingly programs the control processors 10 and 12.

Figure 3:
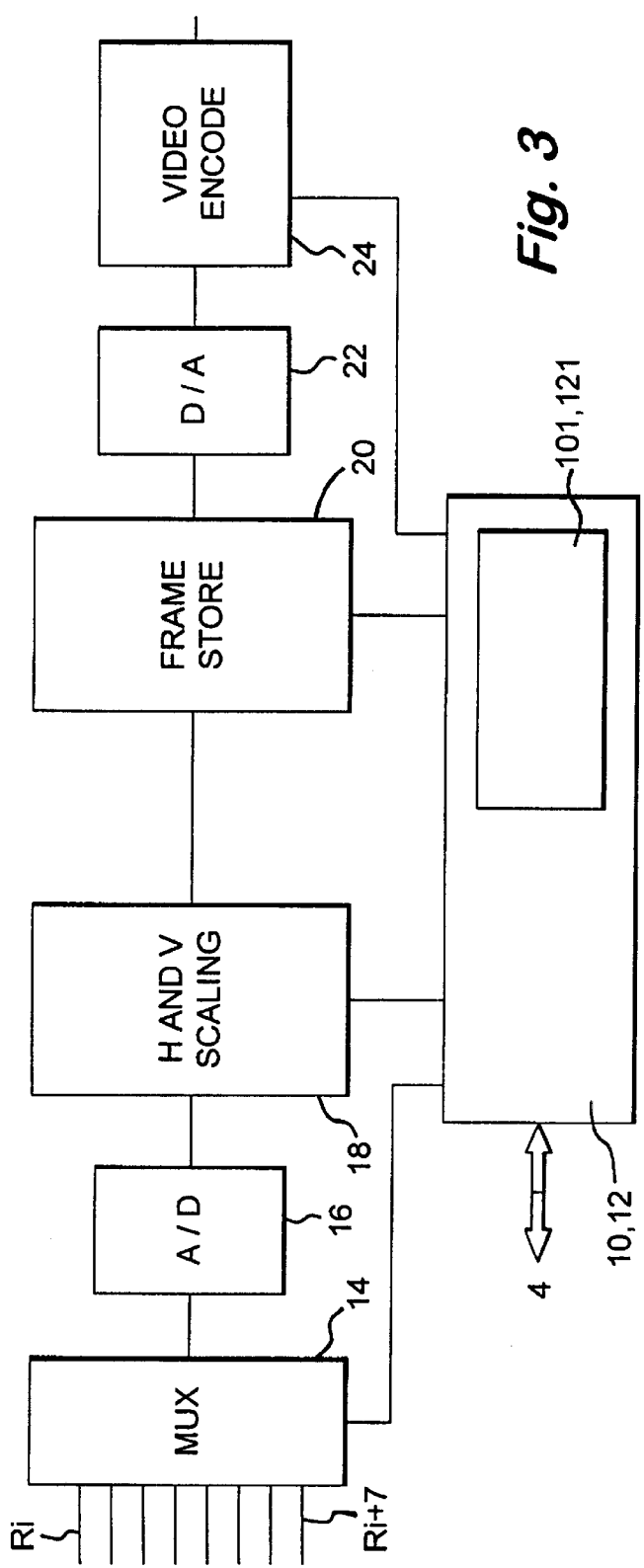
FIG. 3 is a schematic block diagram of a video signal processing channel associated with one monitor of the system of FIGS. 1 and 2.
Figure 4A:
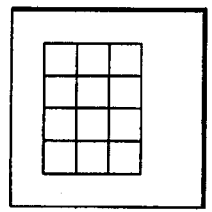
FIGS. 4A to 4E show display configurations.
Figure 4B:
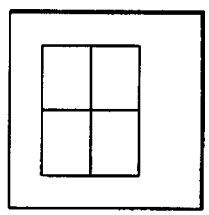
Figure 4C:
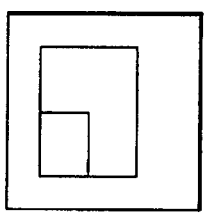
Figure 4D:
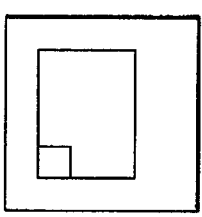
Figure 4E:
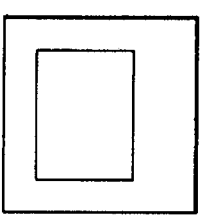

Referring to FIG. 3 each channel of the multipicture processors comprises a multiplexer 14 having eight inputs corresponding to one group of video inputs Ri–Ri+7 from the switcher 2 and one output. The multiplexer 14 is controlled by the control processor 10, 12 to feed any selectable one of the inputs Ri—Ri+7 to an analogue to digital converter 16. The resulting digital video is fed to a circuit 18 which, under the control of the processor 10, 12, scales the video horizontally and vertically to produce an image of desired size (e.g. full screen, ¼ size, ⅑ size).

The thus scaled image is stored in a frame store 20 under the control of the processor 10, 12. The processor 10, 12 controls the write addresses of the store to position the scaled image in a desired position for display, to allow picture-in-picture displays (PIP displays) or a desired number of pictures to be displayed in an array of pictures e.g. four or eight pictures on one monitor, as will be described hereinbelow.

The image or images stored in the frame store 20 are read-out via a digital to analogue converter 22 to a video encoder 24. The video encoder 24 encodes the video to be compatible with the monitors M11, M12, M21, M22. The video encoder 24 is also controlled by the processor 10, 12.

The system described herein above may operate on monochrome video signals. Alternatively colour video signals may be processed. Although the cameras produce analogue signals, the system could be modified to operate on digital signals produced by the cameras.

A preferred version of the system, as shown in FIG. 1 includes the 768 alarm detectors. The programmable controller 4 includes in its program store 41 a look-up table which is programmable to associate the cameras with one or more, e.g. a group of four, alarm detectors AD.

Referring to FIG. 4, the screen formats implemented by the present illustrative embodiment are:

a) full screen in which one image is displayed full size (A);

b) a picture-in-picture (PIP) display with one one-ninth size image inset into a full size image (B);

c) a picture-in-picture display with one one-quarter size inset image (C);

d) an array display comprising four one-quarter size images (D); and e) an array of eight one-ninth size images (E).

Referring to FIG. 5, by way of illustration only, one of many possible display configurations are shown, schematically. For simplicity of illustration, only eight cameras C1–C8 are shown coupled to four monitors (M11–M22) by a video switch network 2, the programmable controller 4 and the display control means 6, 8 being omitted although in reality they would be present and functioning.

In FIG. 5, the network 2 is programmed to connect all eight cameras C1–C8 to monitor M22, via a set of eight outputs e.g. R1–R8. Thus the display control channel (FIG. 3) associated with monitor M22 multiplexes, scales and positions eight one-ninth size images in a single array E on monitor M22. Cameras C6 and C7 are coupled to monitor M21 via a set of two outputs R9, R10. The monitor M21 is controlled to display a PIP display with a one-quarter size inset image C. Cameras C1 to C4 are coupled to monitor M12 via a set of outputs R11–R14. The monitor M12 is controlled to display an array D of four one-quarter size images. Camera C5 is coupled to via an output R15 monitor M11 which displays one full size image A.

Referring to FIG. 6, the system may be programmed so that one monitor e.g. M11 sequences through four different display configurations in a sequence of timing T1 to T4. The switcher 2 and display control 6, 8 are programmed as follows.

The switcher 2 feeds cameras C1 to C8 to the outputs R1 to R8. The multiplexer 14 in the channel of the display control 6, 8 feeds the outputs R1 to R8 selectively to the scaler 18 and frame store 20 as follows:

| Time | Cameras | Display Control |
|------|---------|-----------------|
| T1 | C1 | A Single full size image |
| T2 | C1–C4 | D Four 1/4 size array |
| T3 | C5–C6 | C PIP inset 1/4 size |
| T4 | C1–C8 | E Eight 1/9 size array |

Thus the display formats are controlled by the display control 6, 8 in the example of FIG. 6.

The times T1, T2, T3, T4 may be selected automatically, or may be manually controlled by an operator via a control panel CP, rather than being automatically selected. In other words the operator may manually step-through a sequence.

It will be appreciated that many other sequences and display configurations are possible.

In summary of the above described embodiments a security control system comprises n inputs for receiving video signals from n cameras. A video switcher 2 including a programmable controller 4 is programmable to connect any one of the n inputs to any one of m outputs where m is less than n, in any selectable time sequence.

A display control means 6, 8 connects the m outputs of the switcher 2 to p displays (M) via p channels each associated with m/p of the outputs of the switcher. The display control means has a multiplexer (14) which is able to connect any one of its inputs to an image scaling and positioning circuit (18, 20). The display control means has a programmable controller (10, 12) linked to the controller 4 of the switcher 2 to control the multiplexer and to selectively scale and position the images represented by the video signals on the displays in desired display formats and, by control of the multiplexer to define sequences of displays. Predetermined display formats and predetermined sequences may be stored in the programmable controller of the display control means.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A control system for use with a surveillance system having n video cameras and p display devices, the control system comprising:

a system controller for controlling said control system, having:

video switching means for selectively connecting n video signal inputs from the n video cameras to m outputs; and programmable control means having a storage means for controlling the video switching means according to a plurality of sequences of predetermined display configurations stored in said storage means; said plurality of sequences of predetermined display configurations indicating the video signals to be displayed by each display device, the time sequence in which the video signals are displayed, and the scaling and positioning of the video signals for display; said programmable control means time sequencing through said plurality of sequences of predetermined display configurations; and first and second multi-picture processors for processing in parallel the outputs from said video switching means in accordance with the time sequencing of the predetermined display configurations by said programmable control means; each multi-picture processor having display control means for independently scaling and positioning the m outputs from said video switch means onto the p display devices.

2. A system according to claim 1, further comprising manually operated means for stepping through said plurality of sequences of predetermined display configurations.

3. A control system for use with a surveillance system having n video cameras and p display devices, the control system comprising: a system controller for controlling said control system, having:

first video switching means for selectively connecting n video signal inputs from the n video cameras to m outputs; and programmable control means having a program storage means for controlling the first video switching means according to a plurality of sequences of predetermined display configuration; said programmable control means having a program storage means for storing said plurality of sequences of predetermined display configuration; each of said plurality sequences of predetermined display configurations indicating the video signals to be displayed by each display device, the time sequence in which the video signals are displayed, and the scaling and positioning of the video signals for display; each predetermined display configuration comprising a combination of image display sizes and image display positions for the images represented by the video signals received from the m outputs of the first video switching means; said programmable control means time sequencing through said plurality of sequences of predetermined display configurations; and first and second multi-picture processors for processing in parallel the outputs from said video switching means in accordance with the time sequencing of the predetermined display configurations by said programmable control means; each multi-picture processor having display control means for independently scaling and positioning the m outputs from said first video switching means for display on the p display devices, and having second video switching means for selectively connecting the m outputs to the p display devices; each of said p channels comprising image scaling means and forming means for forming a video signal representing one or more scaled images in selected display positions.

4. A system according to claim 3 further comprising manual operating means for stepping through one of said plurality of sequences of predetermined display configurations.

5. A system according to claim 3, wherein stored image display sizes include full size, and a plurality of fractional sizes.

6. A system according to claim 5, wherein said plurality of fractional sizes include quarter size and on ninth size.

7. A system according to claim 3, wherein stored display configurations include picture-in-picture displays and different array of separate images simultaneously displayed.

8. A system according to claim 7, wherein the different arrays include an array of four images and an array of eight images.

* * * * *